UNITED STATES PATENT OFFICE.

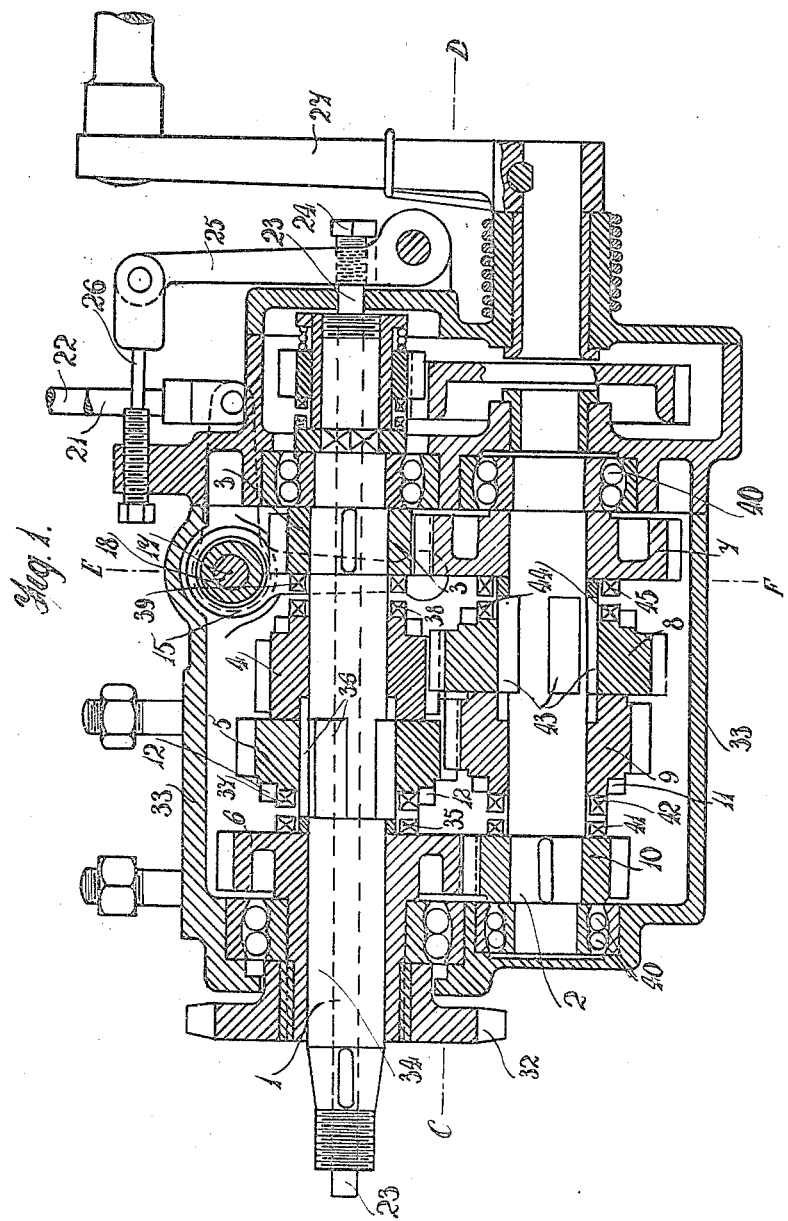

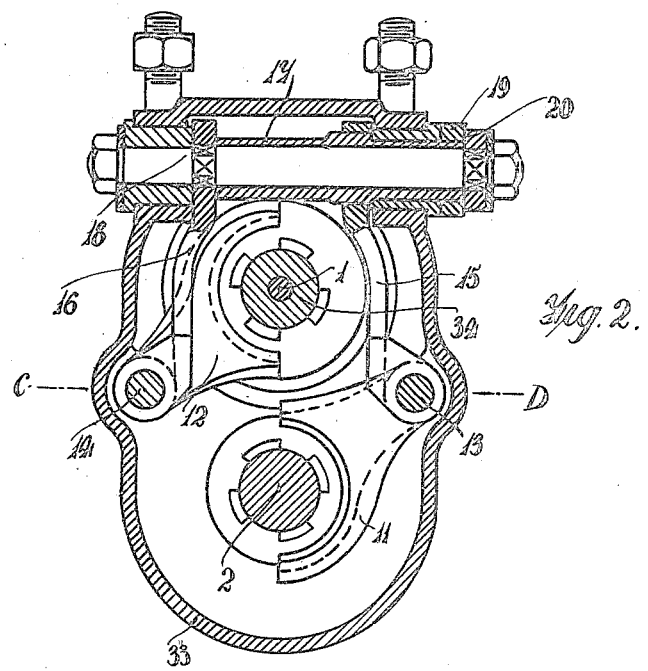
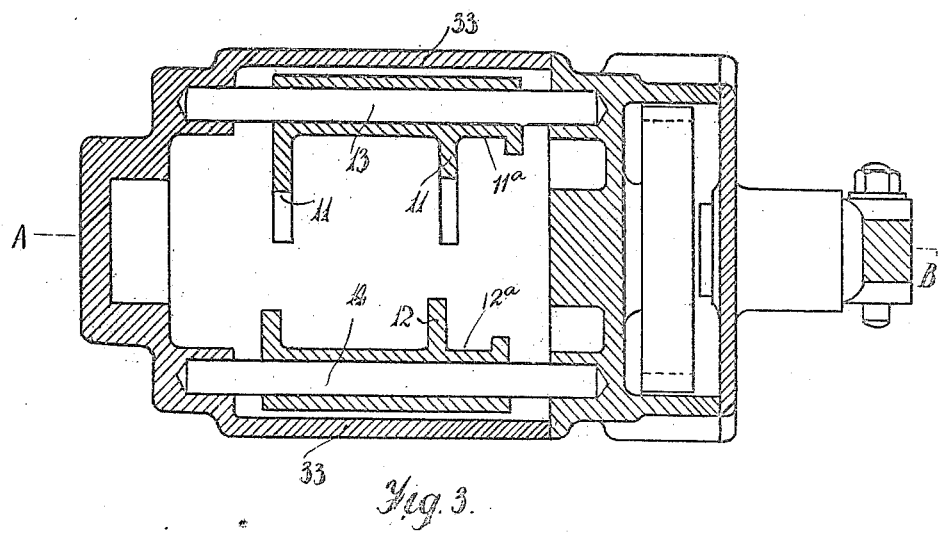

TOM PENTON STUCHFIELD, OF BIRMINGHAM, ENGLAND.

VARIABLE-SPEED GEARING FOR MOTOR-CYCLES.

1,253,544.

Specification of Letters Patent.   Patented Jan. 15, 1918.

Application filed October 23, 1917. Serial No. 198,069.

*To all whom it may concern:*

Be it known that I, TOM PENTON STUCHFIELD, subject of the King of Great Britain, residing at 89 Thornhill road, Handsworth, Birmingham, in the county of Warwick, England, have invented new and useful Improvements in Variable-Speed Gearing for Motor-Cycles; and I do hereby declare the following to be a full, clear, and exact description of the same.

My invention comprises improvements in variable speed gearing for motor cycles and the like and refers to that class of such in which a counter shaft and a lay shaft each provided with four gear wheels in constant mesh are employed for the purpose of giving four different forward driving speed ratios, the object of the present invention being to provide an improved and more compact gear box of this kind.

According to this invention I provide a four speed gear embodying in combination a gear box; a counter shaft or primary shaft; a hollow shaft around the counter shaft; a gear wheel integral or fixed to the hollow shaft and having clutch teeth on its one face; a second gear wheel splined on the counter shaft and having clutch teeth adapted to engage with the clutch teeth on the first wheel; a third gear wheel free on the counter shaft and having clutch teeth on its face; a fourth gear wheel keyed to the counter shaft and having clutch teeth adapted to be engaged by the clutch teeth on said third gear wheel; a lay shaft; a first lay shaft wheel keyed to said lay shaft meshing with the first counter shaft wheel and having clutch teeth on its face; a second wheel free on the lay shaft meshing with the second counter shaft wheel and having clutch teeth adapted to engage with the teeth on the first lay shaft wheel; a third wheel splined on the lay shaft meshing with the third counter shaft wheel and having clutch teeth; and a fourth wheel free on the lay shaft meshing with the fourth counter shaft wheel and having clutch teeth adapted to be engaged by the said clutch teeth on the third lay shaft wheel.

Referring to the drawings:—

Figure 1 is a sectional elevation as on the line A—B in Figs. 2 and 3.

Fig. 2 is a cross section on the line E—F in Fig. 1 with the gear wheels removed.

Fig. 3 is a sectional plan on the line C—D in Figs. 1 and 2, the gear wheels being removed.

Referring to the drawings gearing according to this invention is inclosed within a suitable gear box 33 in which are mounted the two shafts 1 and 2 in parallel relationship. The primary or counter shaft 1 is mounted in the gear box by suitable ball bearings and projects at one side where it may carry suitable clutch mechanism (not shown) whereby it may be driven from the engine, 23 indicating a clutch release plunger, 24 is the clutch release plunger adjusting screw, 25 a control lever and 26 a Bowden wire for releasing the clutch. Mounted on this shaft is a short hollow shaft 34 which also projects outside the gear box and preferably at the same side as the clutch end of the counter shaft. On one end of this hollow shaft is a gear wheel 6 while on the other end is a sprocket or other wheel 32 which serves as the ultimate driver by which motion is transmitted to the rear wheel of the bicycle. This gear wheel 6 may be conveniently machined integral with the hollow shaft 34 and on its inner face a series of dog or clutch teeth 35 are cut. Next to this wheel, which is the largest one on the counter shaft, is a slightly smaller wheel 5 which slides upon a splined part 36 of the counter shaft and has other dog teeth 37 on its face adjacent to the corresponding face of the first wheel 6, so that when these dog teeth engage the first wheel 6 is clutched direct to the counter shaft 1, with the result that the hollow shaft 34 is directly driven by the counter shaft, this being the highest speed.

Next to this second wheel is a third wheel 4 made slightly smaller and of slightly greater width than the corresponding wheel on the lay shaft, but in this case freely mounted upon the counter shaft having dog teeth 38 on its outer face adapted to engage with similar teeth 39 on the inner face of a fourth and smallest wheel 3 which is keyed to the counter shaft and incapable of longitudinal movement relatively thereto. When the third wheel 4 is moved endwise the two sets of dog teeth engage when the third wheel is clutched to the counter shaft.

The lay shaft 2 may be hollow and of a length equal to the inside width of the gear box, being mounted upon a solid fixed shaft, the ends of which are secured to the gear box, or as illustrated it may be in one solid piece and its extremities mounted in the ball bearings 40.

Keyed on this lay shaft 2 is a small wheel 10 which permanently meshes with the first and largest of the wheels 6 on the counter shaft, this first lay shaft wheel having dog teeth 41 on its inner face. Next to this small wheel is another and slightly larger wheel 9 meshing with the second wheel 5 on the counter shaft and capable of sliding along the lay shaft but not being keyed thereto. This second lay shaft wheel is of slightly greater width than the corresponding wheel on the counter shaft, and when moved endwise into engagement with the first lay shaft wheel 10 the second wheel will be clutched to the lay shaft by the dog teeth 42, 41.

Next to this second lay shaft wheel is a third wheel 8 slidable upon a splined part 43 of the lay shaft meshing with the third counter shaft wheel 4 and having dog teeth 44 upon its outer face which are adapted to engage with corresponding teeth 45 upon the inner face of a fourth and largest lay shaft wheel 7 which is free upon the lay shaft and meshes with the smallest wheel 3 on the counter shaft.

Thus on both the counter shaft and the lay shaft there are two inner wheels capable of longitudinal movement relatively to their shaft, one wheel of each pair being, however, capable of relative rotation. This longitudinal movement of the two wheels on the counter shaft and lay shaft is independently effected by two double forks 11, 12. Each double fork engages with the outer face of a pair of wheels, the fork 11 being slidable upon a shaft 13, and the fork 12 upon a shaft 14, the forks 11, 12 being controlled respectively by suitable rocking shafts 17, 18 through crank arms 15, 16 engaging recesses 11ᵃ and 12ᵃ respectively in the forks, so that each pair of wheels may be moved relatively to their shaft. A separate control is of course provided for effecting this movement of the counter shaft wheels as compared with the lay shaft wheels, 19 indicating a lever for controlling the hollow shaft 17, while 20 indicates a lever for controlling the shaft 18, while 21, 22 indicate control rods coupled to 19, 20 and operable by a selector gate (not shown).

The four speeds are obtained as follows:—

*First and lowest speed:*—The third wheel 8 on the lay shaft (taking with it of course the wheel 9) is moved endwise so as to clutch the fourth lay shaft wheel 7 to the lay shaft. The fourth counter shaft wheel 3 being keyed to the counter shaft then drives the fourth lay shaft wheel 7 together with the lay shaft and thence through the first lay shaft wheel 10 keyed to the lay shaft to the first counter shaft wheel 6 and thus to the hollow driven shaft 34 and sprocket 32.

*Second speed:*—The third counter shaft wheel 4 is moved endwise until its clutch teeth engage with those of the fourth counter shaft wheel 3, this third counter shaft wheel being thus locked to the counter shaft. The third counter shaft wheel meshing with the third lay shaft wheel 8 which is splined to the lay shaft drives the lay shaft and thus through the first lay shaft wheel 10 and first counter shaft wheel 6 drives the hollow shaft 34.

*Third speed:*—The second lay shaft wheel 9 is moved endwise into engagement with the first lay shaft wheel 10 when it becomes clutched to the lay shaft, the second lay shaft wheel meshing with the second counter shaft wheel which is splined to the counter shaft, the lay shaft thus being driven by the counter shaft and thence through the first lay shaft wheel 10 and first counter shaft wheel 6 the hollow shaft is driven.

*Fourth and highest speed:*—The second counter shaft wheel 5 is moved endwise to clutch the first counter shaft wheel 6 to the counter shaft when the hollow shaft is directly driven by the counter shaft.

By this invention an extremely compact gear box is obtained in which the respective pairs of wheels are in constant mesh and which is of extremely narrow width, this being particularly important in the case of motor cycles.

The gear box may also incorporate a suitable form of kick starter the reference 27 indicating one of conventional form, in which case the pinion 28 may be conveniently carried by the counter shaft.

It is to be understood that by splined I mean any connection capable of an axial movement but not of a rotary movement; while by dog teeth any equivalent clutching device is intended to be indicated.

What I claim then is:—

1. A four speed gear embodying in combination a gear box; a counter shaft; a hollow shaft around the counter shaft; a gear wheel integral or fixed to the hollow shaft and having clutch teeth on its one face; a second gear wheel splined on the counter shaft and having clutch teeth adapted to engage with the clutch teeth on the first wheel; a third gear wheel free on the counter shaft and having clutch teeth on its face; a fourth gear wheel keyed to the counter shaft and having clutch teeth adapted to be engaged by the clutch teeth on said third gear wheel; a lay shaft; a first lay shaft wheel keyed to said lay shaft meshing with the first counter shaft wheel and having clutch teeth on its face; a second wheel free on the lay shaft meshing with the second counter shaft wheel and having clutch teeth adapted to engage with the teeth on the first lay shaft wheel; a third wheel splined on the lay shaft meshing with the third counter shaft wheel and having clutch teeth; and a fourth wheel free on the lay shaft meshing with the fourth counter shaft wheel and having clutch teeth adapted to be engaged by the said clutch teeth on the third lay shaft wheel all arranged and operating substantially as set forth.

2. A four speed gear embodying in combination a gear box; a counter shaft; a hollow shaft around the counter shaft; a gear wheel integral or fixed to the hollow shaft and having clutch teeth on its one face; a second gear wheel splined on the counter shaft and having clutch teeth adapted to engage with the clutch teeth on the first wheel; a third gear wheel free on the counter shaft and having clutch teeth on its face; a fourth gear wheel keyed to the counter shaft and having clutch teeth adapted to be engaged by the clutch teeth on said third gear wheel; a lay shaft; a first lay shaft wheel keyed to said lay shaft meshing with the first counter shaft wheel and having clutch teeth on its face; a second wheel free on the lay shaft meshing with the second counter shaft wheel and having clutch teeth adapted to engage with the teeth on the first lay shaft wheel; a third wheel splined on the lay shaft meshing with the third counter shaft wheel and having clutch teeth; a fourth wheel free on the lay shaft meshing with the fourth counter shaft wheel and having clutch teeth adapted to be engaged by the said clutch teeth on the third lay shaft wheel; a sliding member having a pair of forks engaging the outer faces of the second and third wheels on the counter shaft; and a second sliding member having a pair of forks engaging the outer faces of the second and third wheels on the lay shaft; for the purpose specified and substantially as set forth.

3. A four speed gear embodying in combination a gear box; a counter shaft; a hollow shaft around the counter shaft; a gear wheel integral or fixed to the hollow shaft and having clutch teeth on its one face; a second gear wheel splined on the counter shaft and having clutch teeth adapted to engage with the clutch teeth on the first wheel; a third gear wheel free on the counter shaft and having clutch teeth on its face; a fourth gear wheel keyed to the counter shaft and having clutch teeth adapted to be engaged by the clutch teeth on said third gear wheel; a lay shaft; a first lay shaft wheel keyed to said lay shaft meshing with the first counter shaft wheel and having clutch teeth on its face; a second wheel free on the lay shaft meshing with the second counter shaft wheel and having clutch teeth adapted to engage with the teeth on the first lay shaft wheel; a third wheel splined on the lay shaft meshing with the third counter shaft wheel and having clutch teeth; a fourth wheel free on the lay shaft meshing with the fourth counter shaft wheel and having clutch teeth adapted to be engaged by the said clutch teeth on the third lay shaft wheel; a sliding member having a pair of forks engaging the outer faces of the second and third wheels on the counter shaft, and a second sliding member having a pair of forks engaging the outer faces of the second and third wheels on the lay shaft, a pivoted crank arm engaging with said sliding member; and a second pivoted crank arm engaging with said second sliding member; for the purpose specified and substantially as set forth.

In testimony whereof I affix my signature.

TOM PENTON STUCHFIELD.

Copies of this patent may be obtained for five cents each, by addressing the "Commissioner of Patents, Washington, D. C."